United States Patent [19]
Glasson et al.

[11] 3,938,052
[45] Feb. 10, 1976

[54] DIGITAL DEMODULATOR FOR PHASE-MODULATED WAVEFORMS

[75] Inventors: Jerry M. Glasson, Skokie; Ira S. King, Chicago, both of Ill.

[73] Assignee: Teletype Corporation, Skokie, Ill.

[22] Filed: May 9, 1974

[21] Appl. No.: 468,325

[52] U.S. Cl. .................. 329/104; 178/88; 325/320; 328/109; 328/117
[51] Int. Cl.$^2$........................................ H04L 27/22
[58] Field of Search ...... 329/104; 328/63, 109, 110, 328/117; 325/320; 178/88

[56] References Cited
UNITED STATES PATENTS

| | | | |
|---|---|---|---|
| 3,209,265 | 9/1965 | Baker et al. | 328/63 |
| 3,643,023 | 2/1972 | Ragsdale et al. | 325/320 X |
| 3,656,064 | 4/1972 | Giles et al. | 329/104 |
| 3,729,684 | 4/1973 | Shuda | 325/320 X |
| 3,739,277 | 6/1973 | Schneider et al. | 325/320 X |
| 3,746,995 | 7/1973 | Schroeder et al. | 325/320 |

OTHER PUBLICATIONS

Jones—"Digital Frequency Discriminator"—IBM Tech. Disclosure Bulletin, Vol. 13, No. 11, Apr. 1971, pp. 3421–3422.

*Primary Examiner*—Alfred L. Brody
*Attorney, Agent, or Firm*—G. D. Green; D. L. Hurewitz; J. L. Landis

[57] ABSTRACT

Digital logic apparatus for demodulating a received phase-modulated carrier wave wherein phase-shifts between successive signalling intervals encode data elements. A shift register serially stores periodic samples of a squared version of the received wave. Exclusive-OR gates compare pairs of stored wave samples, each pair comprising a sample from a previous signalling interval and a sample from a current signalling interval. At least one of the exclusive-OR gates derives synchronizing signals for a local timing generator. For each data element, an integrator is associated with one of the exclusive-OR gates to accumulate a count related to the time during which pairs of similar samples are sensed by its exclusive-OR gate during each signalling interval. The integrator registering the highest count at the end of a given data interval signifies the data element received during that interval. An alternate embodiment is disclosed for less critical applications wherein outputs from digital filters indicate the received data elements.

7 Claims, 18 Drawing Figures

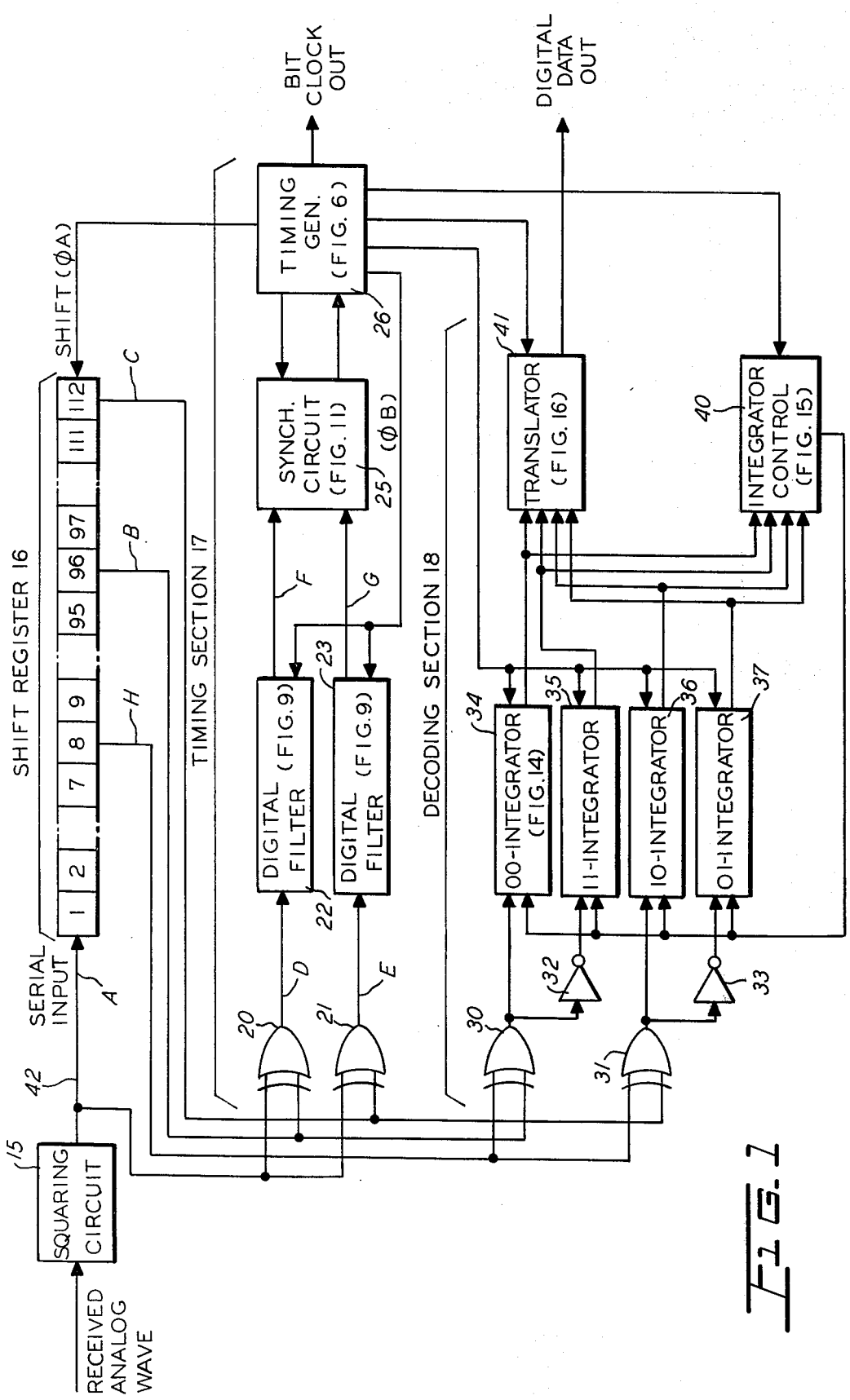

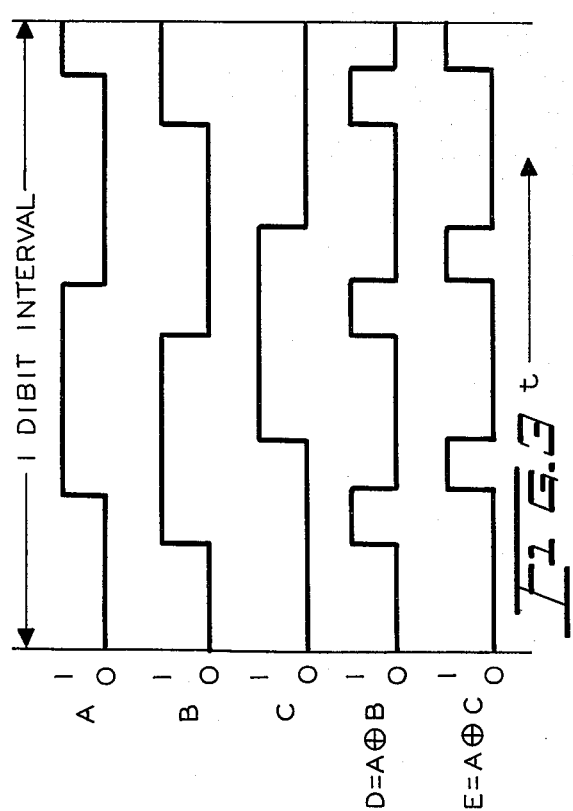
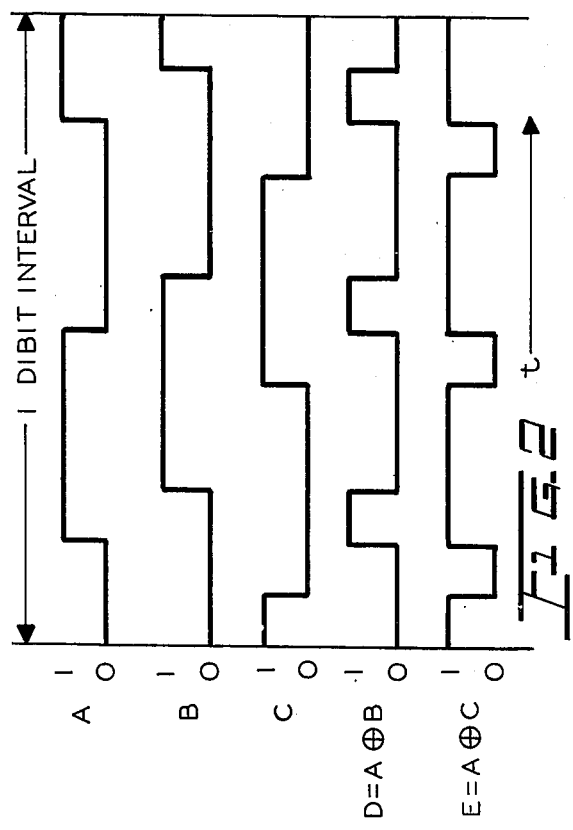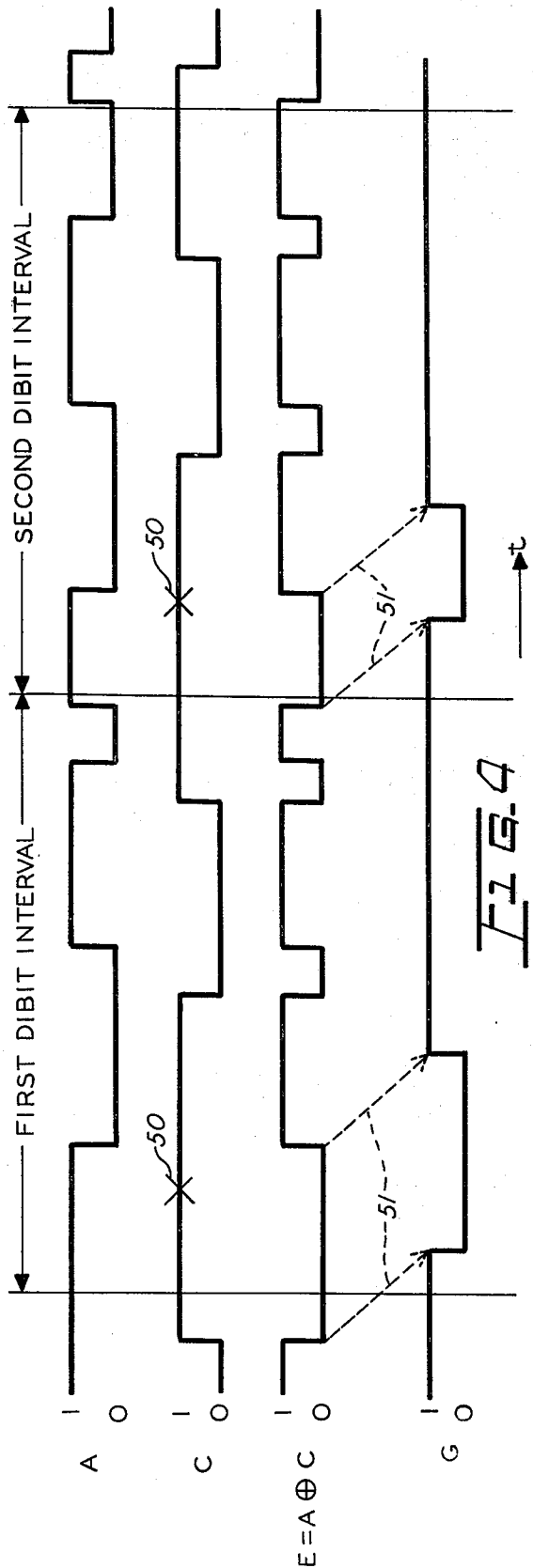

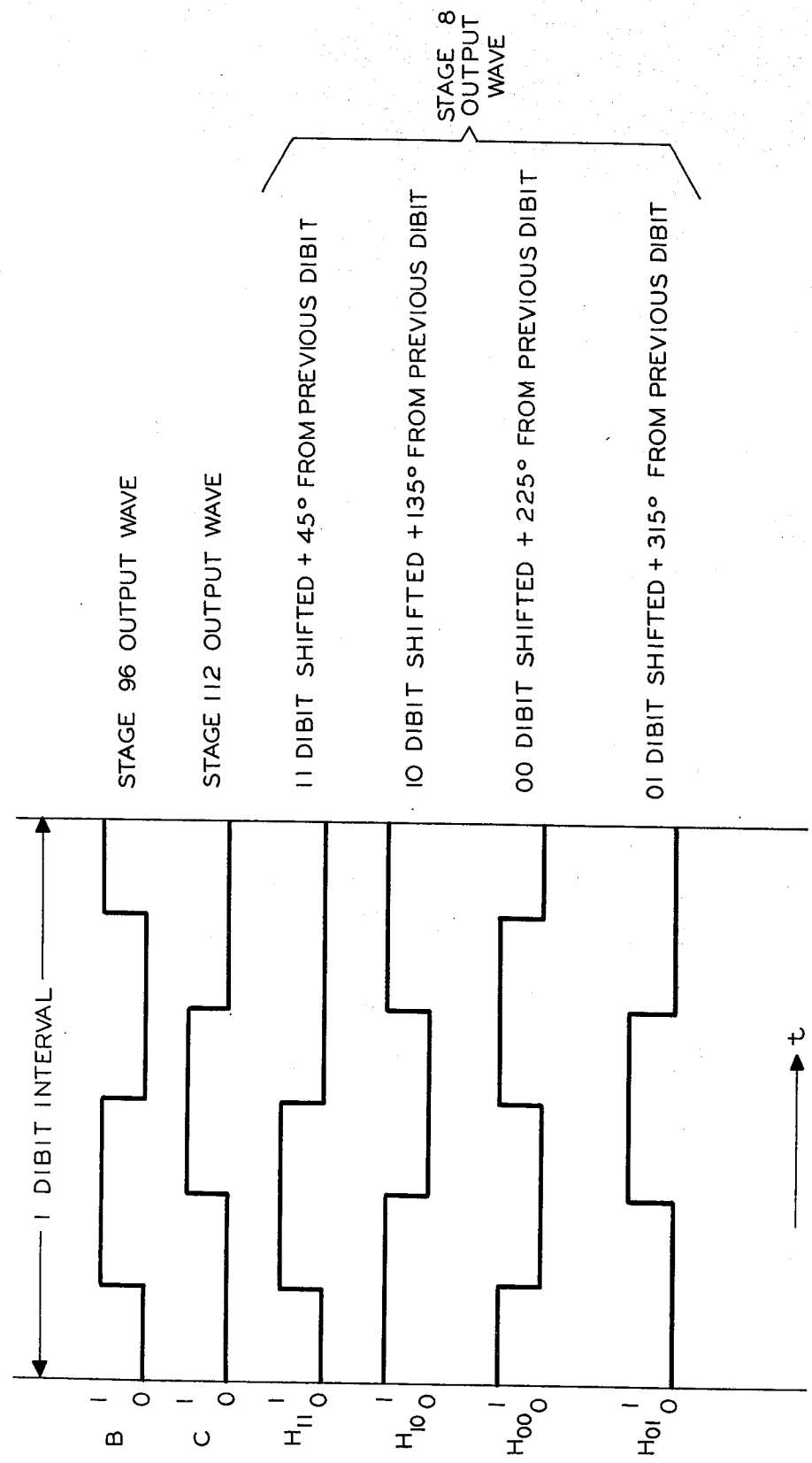

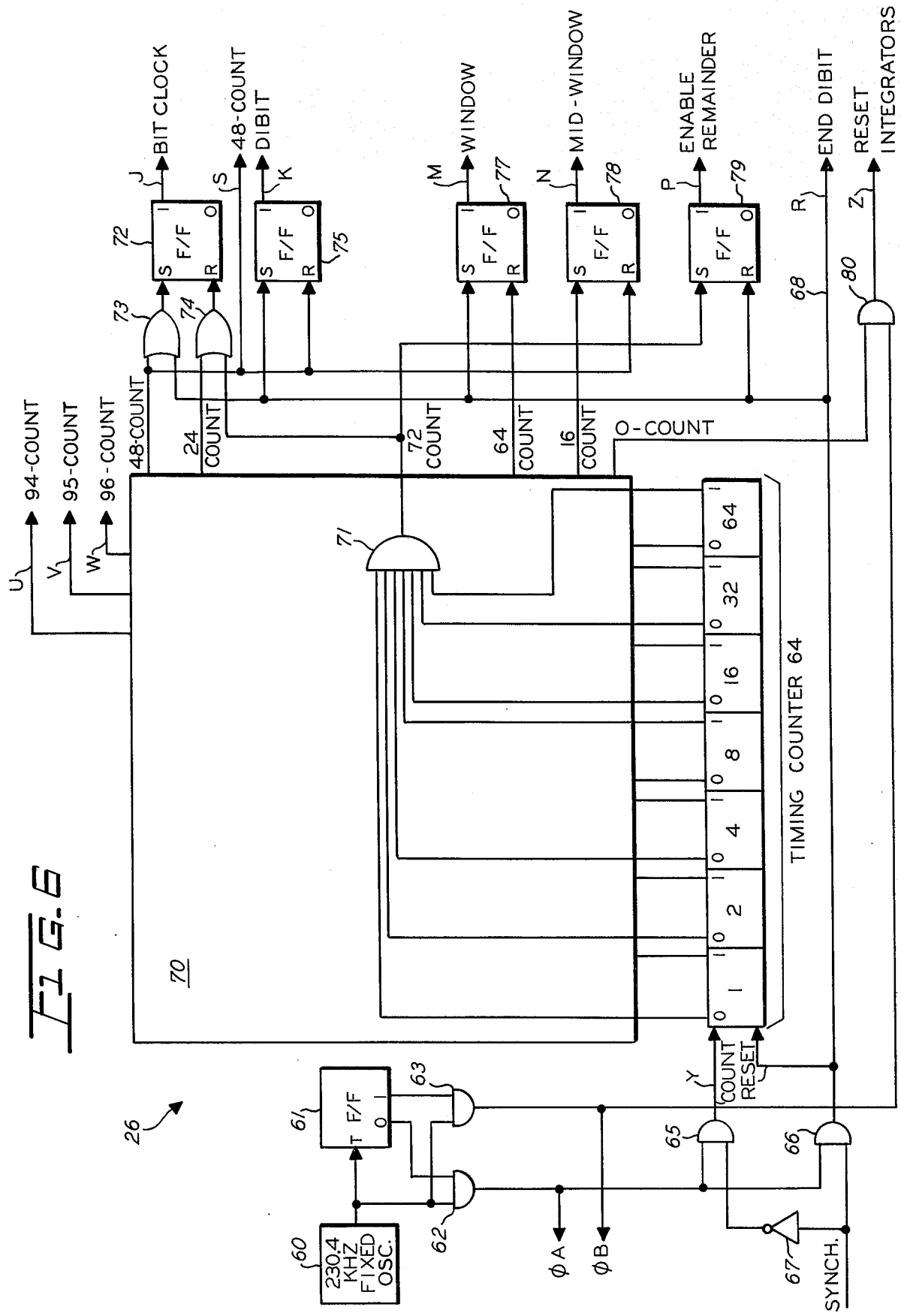

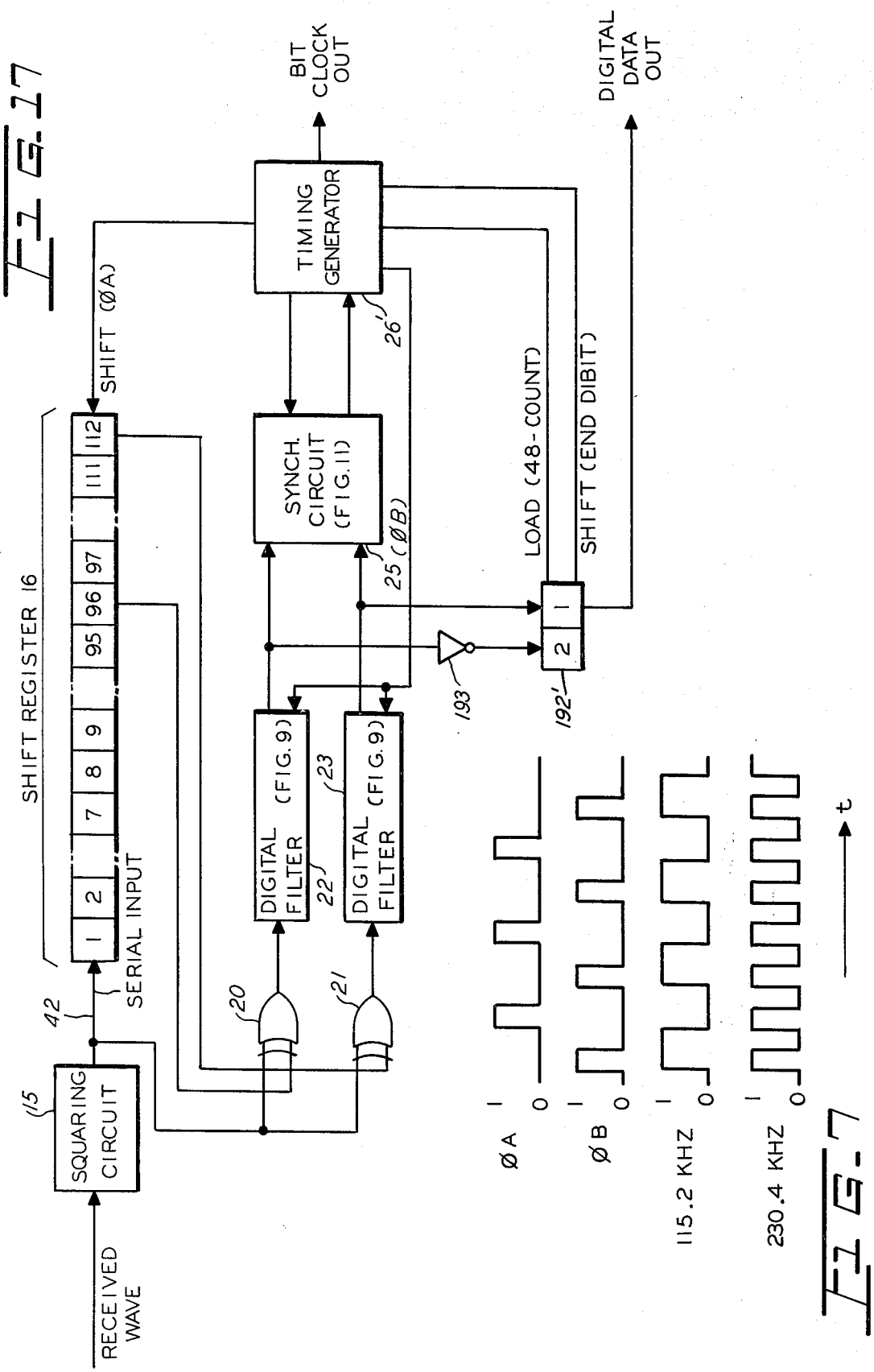

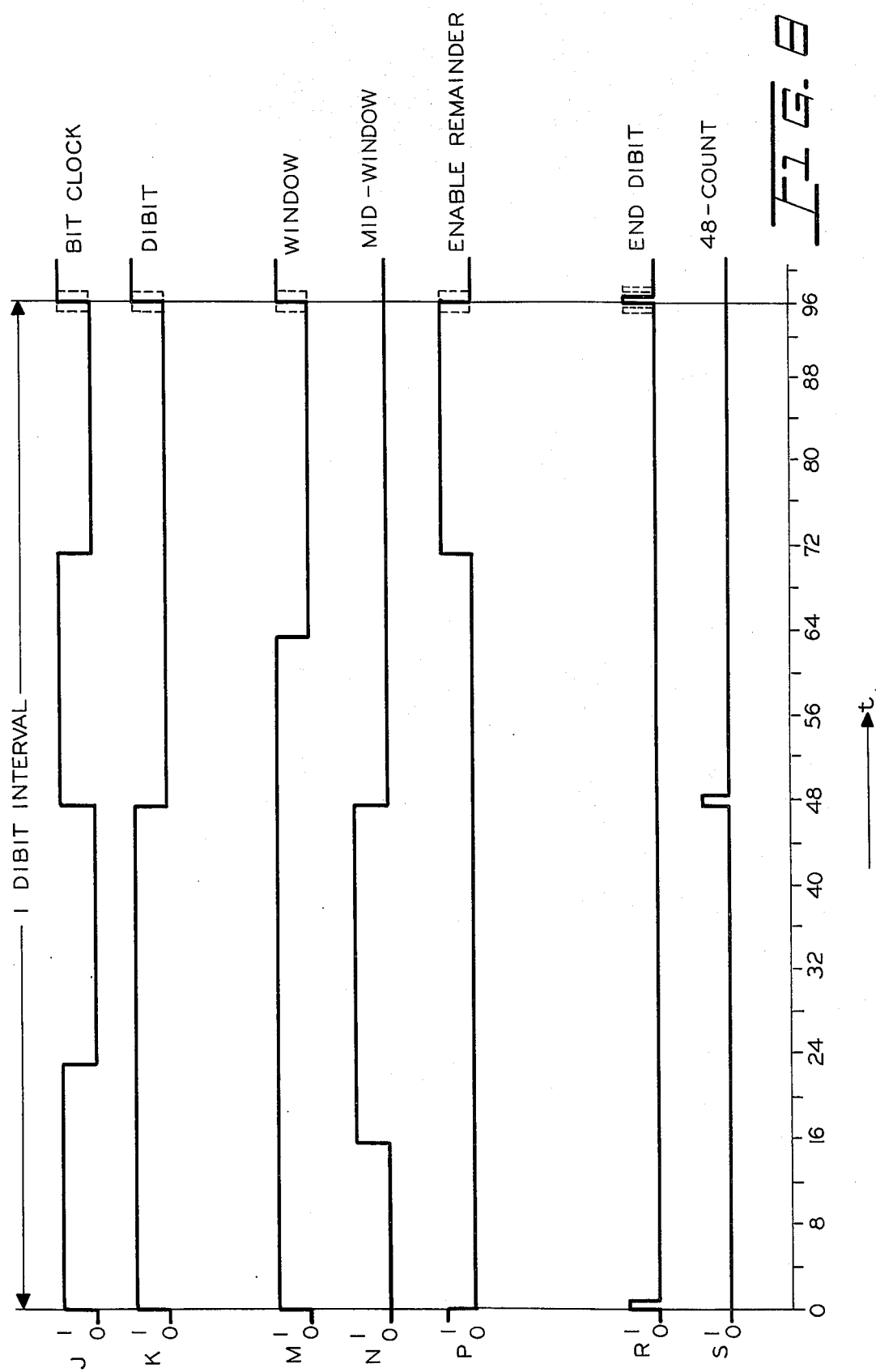

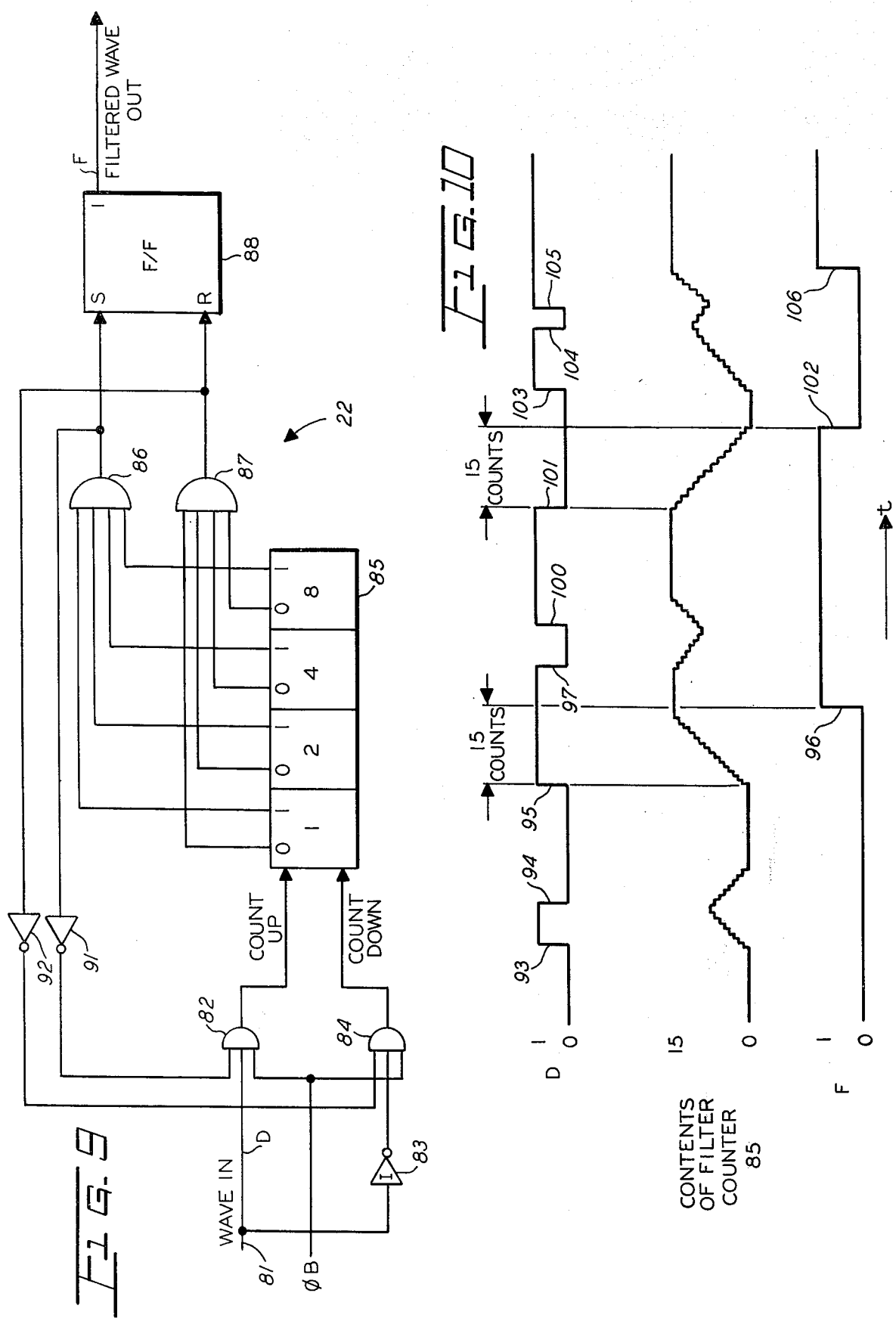

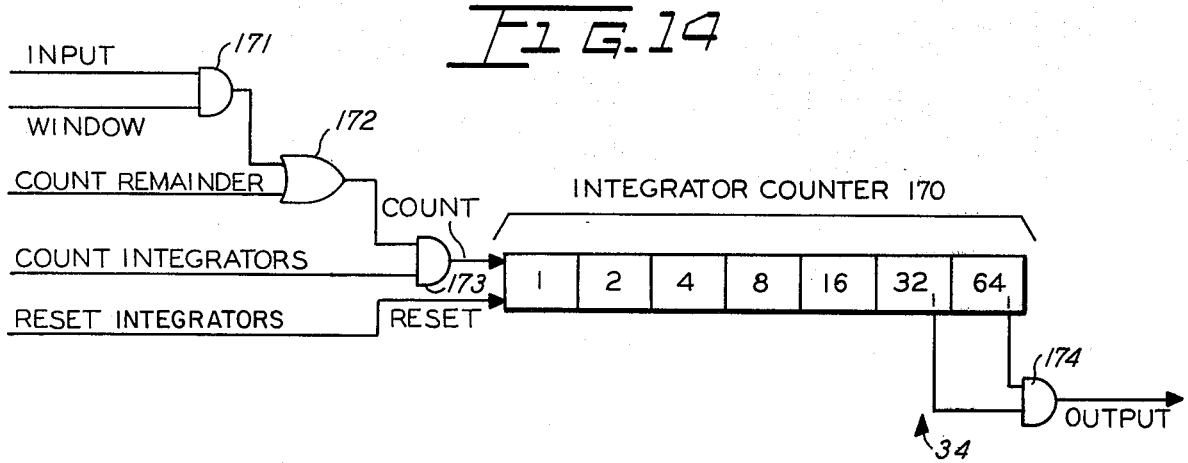
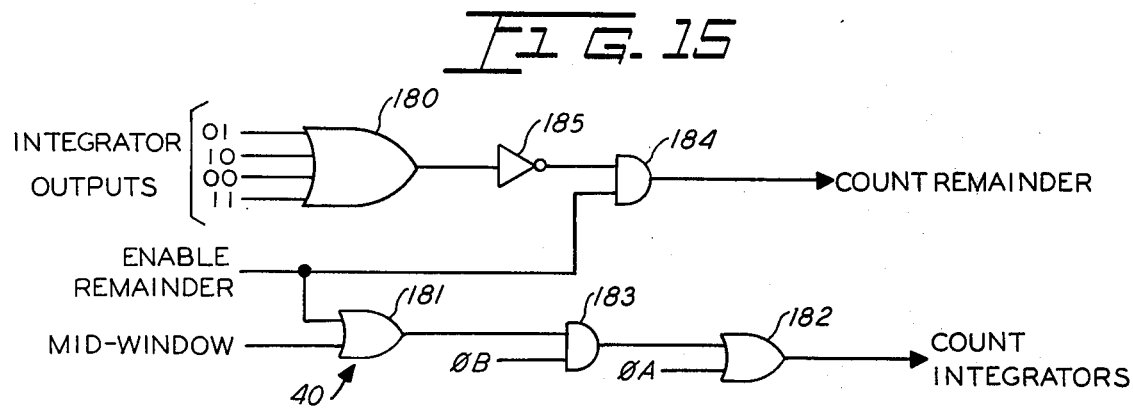
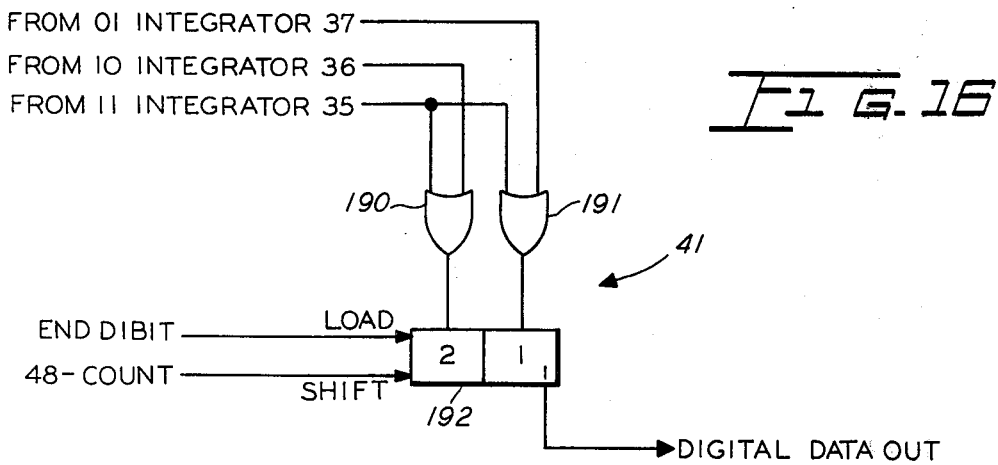

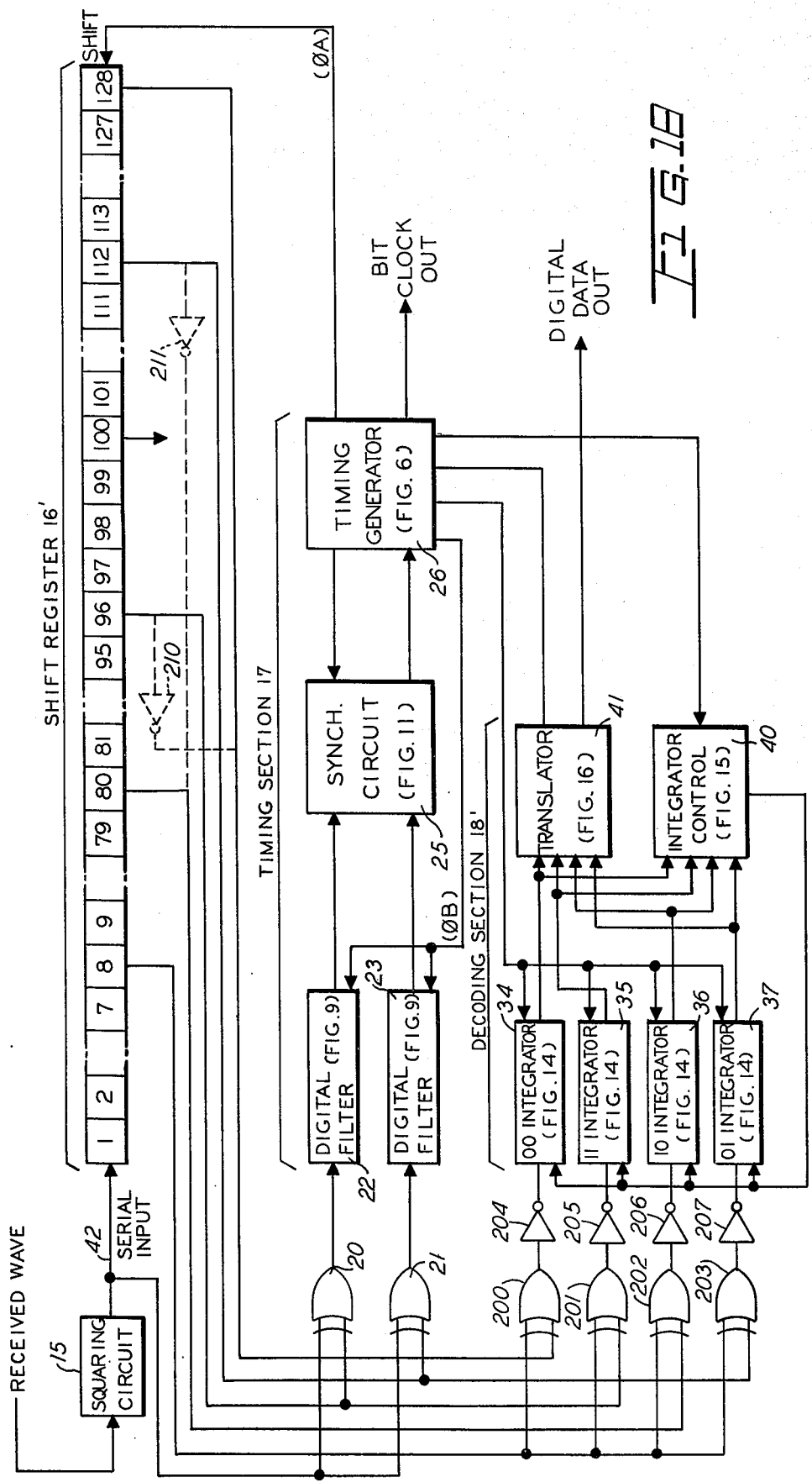

DIGITAL DEMODULATOR FOR PHASE-MODULATED WAVEFORMS

BACKGROUND OF THE INVENTION

1. Field of the Invention

This invention relates to demodulators, and more particularly, to digital demodulators for decoding phase-modulated carrier waves.

2. Description of the Prior Art

Apparatus for transmitting digital data over communications channels by means of phase-modulation techniques is well known in the art. This apparatus has typically comprised such circuit elements as high, low, and band-pass filters, delay lines, amplifiers, and product modulators, all adapted for use with analog waves, for example, as disclosed in U.S. Pat. Nos. 3,128,342 and 3,128,343 issued on Apr. 7, 1964 to P. A. Baker.

The recent development of low-cost digital integrated circuit elements has brought forth the possibility that the modulating and demodulating functions could be accomplished by combinations of such circuit elements with greater reliability and at lower cost than with the analog elements used in the prior art. Demodulators that incorporate some digital circuit elements for decoding purposes have been disclosed in the prior art, for example, see U.S. Pat. No. 3,590,381 issued to Robert G. Ragsdale on Mar. 17, 1969, and U.S. Pat. No. 3,746,995 issued to H. C. Schroeder et al. on July 17, 1973. Both these patents disclose demodulators comprising such analog elements as modulators and filters in combination with digital circuit elements.

It is desirable to provide a digital demodulator that could be fabricated by the techniques used to produce large-scale integrated circuits, without the need for numerous additional discrete components. Thus, it is desirable to provide a digital demodulator that would comprise digital circuit elements almost exclusively. An example of such a digital demodulator is disclosed in U.S. Pat. No. 3,729,684 to Donald G. Shuda.

It is, therefore, an object of this invention to provide improved apparatus for demodulating a received phase-modulated wave that substantially comprises digital circuit elements.

SUMMARY OF THE INVENTION

Digital apparatus for demodulating a received phase-modulated wave, wherein phase-shifts in a carrier wave between successive signalling intervals encode data elements, includes a shift register foro serially storing periodic samples of a squared version of the received wave and a number of exclusive-OR gates, each of which compares a stored wave sample from a previous signalling interval with a stored wave sample from a current signalling interval. In a preferred embodiment of the invention, comprising a timing section and a decoding section, the timing section includes at least one of the exclusive-OR gates connected to a digital filter to generate signals reprsenting transitions between received signalling intervals for synchronizing a local timing generator. The decoding section includes, for each data element, one of the exclusive-OR gates connected to an integrator that essentially accumulates a count realted to the time during which similar wave samples are sensed by its exclusive-OR gate during each signalling interval. At the end of a given signalling interval, the integrator registering the highest count signifies the data element received during that interval.

The integrators can be arranged to emphasize middle portions and deemphasize beginning and ending portions of each signalling interval to improve the reliability of decoding of a received wave that is affected by noise or distortion. In embodiments wherein pairs of phase-shifts differ by 180°, both the number of exclusive-OR gates and the number of stages in the shift register can be reduced.

A specific preferred embodiment of the invention described is a four-phase demodulator that decodes a carrier wave having phase shifts therein of +45°, +135°, +225° and +315° encoding data elements 11, 10, 00 and 01.

An alternate embodiment for less critical applications is also described, wherein outputs from the digital filters indicate the received data elements.

Other embodiments of the invention will become apparent and the invention will be more fully understood from the following detailed description and the attached drawings.

BRIEF DESCRIPTION OF THE DRAWINGS

FIG. 1 is a schematic block diagram of a preferred embodiment of a four-phase digital demodulator, according to the invention;

FIGS. 2, 3, 4 and 5 are graphical representations of digital signals useful in understanding the operation of the digital demodulator shown in FIG. 1;

FIG. 6 is a more detailed schematic block diagram of a timing generator shown in FIG. 1;

FIGS. 7 and 8 are graphical representations of digital signals useful in understanding the operation of the timing generator shown in FIG. 6;

FIG. 9 is more detailed schematic block diagram of a digital filter shown in FIG. 1;

FIG. 10 is a graphical representation of digital signals and the count accumulated in a counter comprised in the digital filter shown in FIG. 9;

FIG. 14 is a more detailed schematic block diagram of an integrator shown in FIG. 1;

FIG. 15 is a more detailed schematic block diagram of an integrator control shown in FIG. 1;

FIG. 16 is a more detailed schematic block diagram of a translator shown in FIG. 1;

FIG. 17 is a schematic block diagram of an alternate embodiment of a four-phase digital demodulator according to the invention; and FIG. 18 is a schematic block diagram of another alternate embodiment of a four-phase digital demodulator according to the invention.

DETAILED DESCRIPTION

Figure 11:
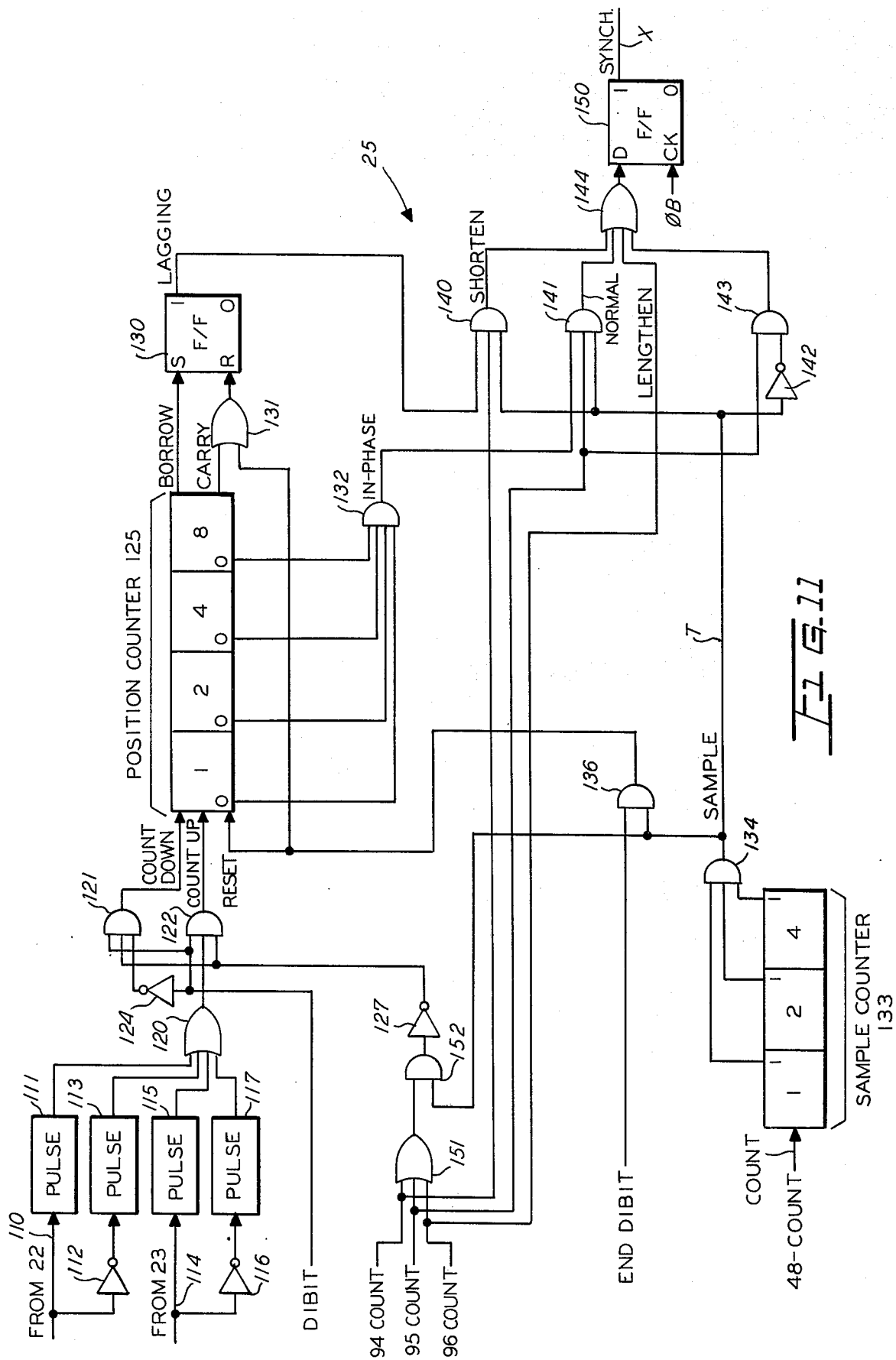
FIG. 11 is a more detailed schematic block diagram of a synchronizing circuit shown in FIG. 1.

The digital demodulator of the invention comprises conventional logic circuit elements such as AND-gates, OR-gates, exclusive-OR gates, flipflops, shift registers, binary counters, pulse forming circuits, and the like. In the following description, the two possible states of a logic signal are characterized as 0 and 1. Certain signals are identified by capitalized names for convenience, e.g., DIBIT signal. Like elements in the different figures are referred to by like numerals. A letter adjacent to a lead in the schematic block diagrams refers to a graphical representation of a signal present on the lead that appears elsewhere in the figures.

FIG. 1 is a schematic block diagram of an exemplary embodiment of a four-phase digital demodulator, according to the invention, for demodulating a received wave whose phase-shifts of +45°, +135°, +225° and +315° between successive signalling intervals encode four data elements. Henceforth, each data element will be termed generally as a dibit combination or identified specifically as a 11, 10, 00 or 01 dibit combination, and signalling intervals will be termed dibit intervals.

Broadly, the digital demodulator shown in FIG. 1 comprises squaring circuit 15, shift register 16, timing section 17, and decoding section 18. More specifically, timing section 17 further comprises exclusive-OR gates 20 and 21, identical digital filters 22 and 23, synchronizing circuit 25, and timing generator 26. Decoding section 18 further comprises exclusive-OR gates 30 and 31, inverters 32 and 33, identical integrators 34, 35, 36 and 37, integrator control 40, and translator 41. Timing generator 26 generates timing signals that are connected to the several elements of the digital demodulator.

Several of the circuit blocks in FIG. 1 are marked with cross references to other figures of the drawings that show the elements of those blocks in greater detail.

In operation, a phase-modulated wave received from a communications channel, e.g., a telephone line, is converted by squaring circuit 15 to logic levels of 0 and 1. That is, if the input to squaring circuit 15 is negative, the output thereof is 0, and if the input to squaring circuit 15 is positive, the output thereof is 1. Such a squaring circuit is well known in the art. The output of squaring circuit 15 is fed to the serial data input of shift register 16 via lead 42. The function of shift register 16 in the digital demodulator of the invention is analogous to that of the tapped delay line in the analog demodulator described in U.S. Pat. No. 3,128,343, noted above.

A shift pulse is periodically applied to the SHIFT input of shift register 16 by timing generator 26. The designation $\phi A$ identifies one of a number of timing signals generated by timing generator 26. In the exemplary embodiment, $\phi A$ comprises 96 shift pulses per dibit interval. Thus, the signal on lead 42 is sampled 96 times per dibit interval, and shift register 16 stores, in its 112 stages, samples representing the squared input wave during essentially the previous 1-1/6 dibit intervals. The output signal of a given stage of shift register 16 is made up of the successive samples stored in that stage and is, therefore, a delayed version of the signal on lead 42. Thus, the output signal of stage 96 is delayed one dibit interval with respect to the signal on lead 42, and the output signal of stage 112 is delayed 1-1/6 dibit intervals with respect to the signal on lead 42.

In the exemplary embodiment, the carrier frequency of the received analog wave is 1800 hz., and the data rate is 1200 dibit intervals/second. Therefore, each dibit interval comprises 1½ cycles of carrier, and samples representing one cycle of carrier occupy 64 stages of shift register 16. The 16 stages 97 to 112 store samples representing one-quarter cycle of carrier. Thus, the output signal of stage 112 is shifted in phase one-quarter cycle of carrier (−90°), with respect to the output signal of stage 96.

Exclusive-OR gate 20 receives as inputs the signal on lead 42 and the output signal of stage 96 of shift register 16. Similarly, exclusive-OR gate 21 receives as inputs the signal on lead 42 and the output signal of stage 112. Since the carrier wave in a given received dibit interval is shifted in phase from the carrier wave in the previous dibit interval by an odd multiple of 45°, the two input signals to each of exclusive-OR gates 20 and 21 are always out of phase, also by an odd multiple of 45°.

The action of an exclusive-OR gate having rectangular waves as inputs can be likened to that of a product modulator having sinusoidal waves as inputs. As is well known, a product modulator having two out-of-phase sinusoidal waves of the frequency $\omega$ applied to the inputs thereof produces an output wave comprising both a sinusoidal component of frequency $2\omega$ and a d-c component. The polarity and the magnitude of the d-c component are related to the difference in phase between the two input waves. Similarly, the output signal of an exclusive-OR gate having as its input signals two rectangular waves with frequency $\omega$, but out of phase, is a rectangular wave that includes a $2\omega$ term, and the symmetry of the output signal is a function of the phase angle between the two input signals.

The action of an exclusive-OR gate, such as gate 20, having two out-of-phase, like frequency rectangular waves as input signals is graphically illustrated in FIG. 2. Waves A and B differ in phase, wave A being +45° out of phase with wave B. Wave D is the output of an exclusive-OR gate, having waves A and B as inputs. Note that when waves A and B agree, wave D is 0, but when waves A and B differ, wave D is 1. Note also that the frequency of wave D is twice that of waves A and B, and that, in this example, wave D is predominantly 0.

Wave C is −90° out of phase with wave B, and −135° out of phase with wave A. Wave E represents the output of an exclusive-OR gate having waves A and C as inputs. Note that the frequency of wave E is also twice that of waves A or C, but that wave E is predominantly 1.

Waves A, B, C, D and E of FIG. 2 correspond substantially to the signals appearing on like-labeled leads in FIG. 1 during a dibit interval when the dibit combination 11 is received, as encoded by a +45° phase shift in the carrier wave between the previous dibit interval and the current dibit interval.

When the 01 dibit combination is received, as encoded by a +315° phase shift in the carrier wave between the previous dibit interval and the current dibit interval, the phase relationships among the waves in FIG. 2 will appear as shown in FIG. 3. In FIG. 3, wave A is +315° out of phase with wave B, and wave C is −90° out of phase with wave B. Note here that wave D is predominatly 0, as it was in FIG. 2, but wave E is also predominantly 0, a change from its condition in FIG. 2.

Similarly, it can be shown that for the 10 dibit combination, represented by a phase shift of +135°, waves D and E will both be predominantly 1; and that for the 00 dibit combination represented by a phase shift of +225, waves D and E will be predominantly 1 and predeominantly 0, respectively.

Referrring again to FIG. 1, the output signals of exclusive-OR gates 20 and 21 are filtered by digital filters 22 and 23, respectively, to remove short-term changes in these signals. The output signal of each filter is 1 when its input is predominantly 1, and 0 when its input is predominantly 0. However, the filtering action causes a delay, so that the filtered output signal lags the input signal by 15 counts of timing signal $\phi B$.

The output signals of filters 22 and 23 indicate the different dibit combinations received. The output signal of filter 22 coresponds to the second bit of the dibit combination, and the output signal of filter 23 corresponds to the first bit of the dibit combination. The transitions in the output signals from filters 22 and 23 are used to provide synchronizing information to synchronizing circuit 25, which further controls timing generator 26 to synchronize all timing signals in the digital demodulator with the received analog wave.

From the above discussion, it may appear that the output signals of filters 22 and 23 do not change when repeated identical dibit combinations are received. This is, indeed, the case for repeated 00 or 10 dibit combinations. However, repeated 11 or 01 dibit combinations cause some transitions in the output signals of filters 22 and 23. If it is necessary to repeat a dibit combination continuously, as in an idling signal, the 11 dibit combination or the 01 dibit combination is repeated, so that transitions for maintaining synchronization occur. It should be noted here that the problem of maintaining synchronization when certain repeated dibits are received is also significant with respect to the prior art analog demodulators.

FIG. 4 is a graphical representation showing how repeated 11 dibit combinations cause transitions in the output signal of filter 23. In FIG. 4, wave A is represented as it would appear during two dibit intervals. The +45° phase shift in wave A between the dibit intervals encodes a 11 dibit combination. Note the transition between the first and second dibit intervals. Because only 1½ cycles of carrier are included in each dibit interval, the advance of 45° in phase of wave A during the second dibit interval with respect to the first dibit interval results in an absolute phase shift of +225° in wave A between the end of the first dibit interval and the beginning of the second dibit interval, thus introducing a significant discontinuity into the wave at the transition between dibit intervals.

Wave C represents an earlier portion of wave A as it would appear if a succession of 11 dibit combinations is received. Recall that wave C is delayed one dibit interval and shifted in phase by −90° with respect to wave A. The marks 50 on wave C represent transitions between dibit intervals. Wave G represents the output signal of digital filter 23 in FIG. 1 having wave E as input. Dotted arrows 51 relate the long-term transitions in wave E to the resulting transitions in wave G. Note, however, that short-term transitions in wave E are removed by the action of filter 23 and do not result in transitions in wave G.

As noted avove, the outputs of digital filters 22 and 23 are related to the actual dibits being received. More specifically, the output of digital filter 22 corresponds to the inverse of the second digit of the dibit, and the output of digital filter 23 corresponds to the first digit of the dibit. Appropriate logic circuits can be provided to translate the outputs of digital filters 22 and 23 to a serial bit stream for output from the demodulator, as will be described later with respect to an alternate embodiment of the invention. Unfortunately, output signals from the digital filters are adversely affected by noise and delay distortion that may be introduced by the communications channel. In the presence of such adverse effects, digital data translated directly from the output signals of digital fitlers 22 and 23 could be erroneous. However, these output signals are reliable enought for synchronizing purposes, even when digital data translated therefrom may contain errors. As will be described, the preferred embodiment of the invention includes integrators that emphasize phase comparisons made during the mid-portion of each received dibit interval to counteract the effects of noise and distortion.

Referring again to FIG. 1, exclusive-OR gate 30 is connected to compare the output signals from stages 8 and 96 of shift register 15, and exclusive-OR gate 31 is connected to compare the output signals from stages 8 and 112 of shift register 15. With respect to the output signal of stage 8, the output signal of stage 96 represents the signal from the previous dibit interval shifted in phase by +45°, and the output signal of stage 112 represents the signal from the previous dibit interval shifted in phase by −45°.

FIG. 5 shows the phase relationships among the output signals from stages 8, 96 and 112 of shift register 15 for different received dibit combinations. The output signals of stages 96 and 112 are 90° out of phase with each other, as shown by waves B and C. The output signals of stages 8 and 96 are in phase when the 11 dibit combination is received, +90° out of phase when the 10 dibit combination is received, +180° out of phase when the 00 dibit combination is received, and +270° out of phase when the 01 dibit combination is received. Therefore, the output signal of exclusive-OR gate 30 is predominantly 0 when the 11 dibit combination is received, because the two inputs to gate 30 are substantially identical. Similarly, the output signal of gate 30 is predominantly 1 when the 00 dibit combination is received, because the two inputs to gate 30 are substantially opposite. However, when either the 10 or 01 dibit combination is received, the output signal of gate 30 alternates between 1 and 0.

A similar analysis can be made for the output signal of exclusive-OR gate 31. Thus, the output signal of gate 31 is substantially 1 when the 10 dibit combination is received, and substantially 0 when the 01 dibit combination is received, and alternates between 0 and 1 when either the 00 or 11 dibit combination is received.

The outputs of gates 30 and 31 are connected directly to the inputs of integrators 34 and 36, respectively, and through inverters 32 and 33, to integrators 35 and 37. Thus, the input signal to integrator 34 is substantially 1 only when the 00 dibit combination is received; the input signal to integrator 35 is substantially 1 only when the 11 dibit combination is received; the input signal to integrator 36 is substantilly 1 only when the 01 dibit combination is received; and the input signal to integrator 37 is substantially 1 only when the 10 dibit combination is received.

Integrators 34, 35, 36, and 37 comprise counters that are enabled to cound during a mid-portion of each dibit interval when the input to the integrator is 1. After the mid-portion of a given dibit interval, each integrator contains a count; the highest count denotes which dibit combination was received. Adverse conditions in the communications channel may decrease the spread between the counts in the integrators, but it is most likely that the highest count represents the dibit combination actually transmitted. In the preferred embodiment, integrators 34, 35, 36 and 37 are arranged to count during the middle two-thirds of each dibit interval, and to give double weight to the middle third of each dibit interval, thereby increasing the probability of decoding the correct dibit combination in the presence of noise or distortion in the communications channel.

Integrator control 40 includes means for controlling the counters in integrators 34, 35, 36 and 37. Translator 41 serially generates two output bits to represent each received dibit combination. Timing generator 26 generates a bit clock signal in phase with the serial data signal from translator 41 to synchronize data utilization means receiving digital data from translator 41.

The various elements of the digital demodulator shown in FIG. 1 will now be described in more detail.

FIG. 6 is a detailed block schematic diagram of timing generator 26 for use with an embodiment of the invention wherein the bit rate is 2400 bits/second, the dibit rate is 1200 dibits/second, and the carrier frequency is 1800 Hz.

Referring to FIG. 6, a primary timing signal is generated by fixed oscillator 60 at a frequency of 230.4 KHz, 192 times the dibit rate. AND-gates 62 and 63 derive out-of-phase 115.2 KHz signals $\phi A$ and $\phi B$ from the primary timing signal and the outputs from dividing flipflop 61. FIG. 7 shows the relationships among the 230.4 KHz signal from oscillator 60, the 115.2 KHz signal from the 1-output of flipflop 61, and the $\phi A$ and $\phi B$ signals. FIG. 8 illustrates the relationships among other timing signals generated by timing generator 26. FIG. 8 will be referred to as timing generator 26 is described in more detail.

Referring again to FIG. 6, signal $\phi A$ is gated into timing counter 64 via AND-gate 65. Counter 64 is a conventional arrangement of seven flipflops connected as a binary counter. The count in counter 64 is increased by 1 by each pulse on the COUNT input thereof, and all stages of the counter are set to 0 by a pulse on the RESET input thereof. Each stage of counter 64 generates output signals at a 1-output and a 0-output. When a counter stage is said to contain a 1, the signals on the 1- and 0-outputs are 1 and 0, respectively; when a counter stage is said to contain a 0, the signals on the 1- and 0-outputs are 0 and 1, respectively. Other binary counters in the digital demodulator that will be described subsequently are similar in design and operation to timing counter 64.

Signal $\phi A$ is connected to the RESET input of counter 64 via AND-gate 66. If SYNCH is 1, gate 66 gates $\phi A$ into the RESET input of counter 64, onto lead 68 to form the END DIBIT signal, and to various SET and RESET inputs of flipflops 72, 75, 77 and 79. If SYNCH is 0, gate 65, through the action of inverter 67, gates $\phi A$ into the COUNT input of counter 64.

The source of SYNCH is synchronizing circuit 25, shown in FIG. 1. Usually this signal enables gate 66 during count 95 so that timing counter 64 is reset to 0 by $\phi A$ during count 95. Thus, the basic timing cycle generated by timing generator 26 is 96 counts long, corresponding with one received dibit interval. The length of each timing cycle is determined primarily by the frequency of the primary timing signal generated by oscillator 60. However, if that timing signal is not in synchronism with the timing signal generated by the corresponding oscillator in the modulating transmitter at the distant end of the communications channel, the locally generated timing signals may begin to lag or lead the received analog wave. Thus, synchronizing circuit 25 corrects for lagging local timing signals by shortening timing cycles, and for leading local timing signals by lengthening timing cycles. This is accomplished by periodically resetting timing counter 64 at the end of count 94 or count 96, respectively, instead of at the end of count 95.

Various counts of counter 64 are decoded by AND-gates comprising decoder 70. For example, AND-gate 71 decodes the count of 72 in counter 64 to generate the 72-COUNT signal. Inputs to AND-gate 71 are connected to 0-outputs from stages 1, 2, 4, 8 and 32 of counter 62, and to 1-outputs from stages 8 and 64 of counter 62. Thus, the output of AND-gate 71 is 1 when the count in counter 62 is 1001000, the binary equivalent of 72. Other AND-gates (not shown) are provided to similarly decode counts of 0, 16, 24, 48, 64, 72, 94, 95 and 96. The 48-COUNT signal is shown in FIG. 8.

A BIT CLOCK signal, shown in FIG. 8, is generated at the 1-output of flipflop 72, which is set by either END DIBIT or 48-COUNT, and reset by 24-COUNT or 72-COUNT. Thus, two BIT CLOCK cycles are generated during each timing cycle. Similarly, a DIBIT signal shown in FIG. 8 is generated at the 1-output of flipflop 5, which is set by END DIBIT and reset by 48-COUNT. Flipflops 77, 78 and 79, respectively, generate WINDOW, MID-WINDOW and ENABLE REMAINDER signals, shown in FIG. 8, in response to the various indicated counts from decoder 70. Note in FIG. 8 that transitions in the BIT CLOCK, DIBIT, WINDOW and ENABLE REMAINDER signals occur at either 95-COUNT, 96-COUNT or 97-COUNT in correspondence with the END DIBIT signal.

Figure 13:
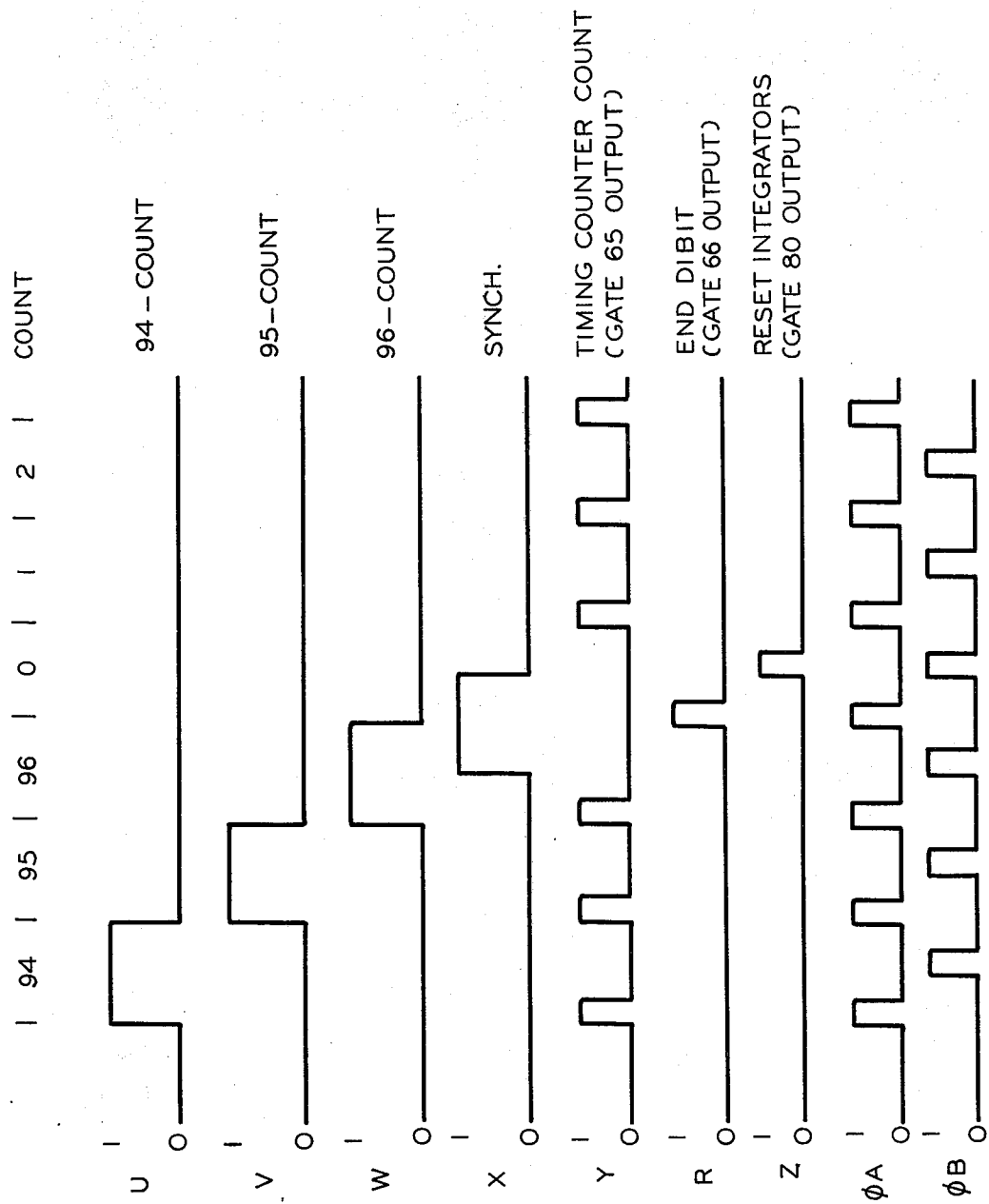

AND-gate 80 generates a RESET INTEGRATORS signal by combining 0-COUNT from decoder 70 with $\phi B$. This signal is shown in FIG. 13, which will be described in more detail when the operation of translator 41 is discussed.

FIG. 9 is a more detailed block diagram of digital filter 22, which is identical to digital filter 23. AND-gates 82 and 84 gate signal $\phi B$ to the COUNT UP and COUNT DOWN inputs, respectively, of reversible four-stage binary counter 85. AND-gate 86 is conneced to the 1-outputs of all stages of counter 85, and is enabled when counter 85 registers 15. AND-gate 87 is connected to the 0-outputs of the stages of counter 85, and is enabled when counter 85 registers 0. The outputs of gates 86 and 87 are connected, respectively, to SET and RESET inputs of flipflop 88, and via inverters 91 and 92. to inputs of gates 82 and 84.

The unfiltered input signal to digital filter 22 is connected by lead 81 to gate 82 and through inverter 83 to gate 84. If the signal on lead 81 is 1, and counter 85 does not register is gate 82 is enabled by each pulse of $\phi B$ to increment counter 85. Conversely, if the signal on lead 81 is 0, and counter 85 does not register 0, gate 84 is enabled by each pulse of $\phi B$ to decrement counter 85. When counter 85 registers 0, the output of gate 87 becomes 1, resetting flipflop 88, and disabling gate 84 through inverter 92 to prevent counter 85 from being decremented further. When counter 85 registers 15, the output of gate 86 becomes 1, setting flipflop 88, and disabling gate 82 through inverter 91 to prevent counter 85 from being incremented further.

The operation of digital filter 22 can be more clearly understood by referring to FIG. 10. In FIG. 10, the relations among waves D and F and the contents of counter 85 are shown. Wave D has been arbitrarily chosen to demonstrate the operation of filter 22. Counter 85 registers 0 initially. After transition 93 in wave D, counter 85 is incremented at the $\phi B$ rate of 96 counts per dibit until after transition 94, when counter 85 is decremented at the same rate. After transition 95, counter 85 is again incremented and because wave D remains 1 for more than 15 counts, the contents of counter 85 eventually reach 15 and wave F changes to 1 at transition 96. Note that transition 96 lags its causing transition 95 by 15 counts.

After transition 97 wave D, counter 85 is decremented until after transition 100, when counter 85 is again incremented. After transition 101, counter 85 is decremented until the contents of counter 85 become 0, and wave F becomes 0 at transition 102. Note again that transition 102 lags its causing transition 101 by 15 counts.

The series of transitions 103, 104 and 105 in wave D, and the resulting contents of counter 85 and transition 106 in wave F show what happens when a short-lived transition occurs within 15 counts of a transition that has moved counter 85 away from one of its limits, specifically the 0-limit here. Note that the short-lived transition further delays transition 106.

FIG. 11 is a detailed block schematic diagram of synchronizing circuit 25. The output signal from digital filter 22 is connected by lead 110 to pulse generating circuit 111 and, via inverter 112, to pulse circuit 115. Similarly, the output signal from digital filter 23 is connected by lead 114 to pulse generating circuit 115, and, via inverter 116, to pulse generating circuit 117. Outputs from pulse generating circuits 111, 113, 115 and 117 are connected to OR-gate 120. Each pulse generating circuit 111, 113, 115 and 117 emits an output pulse when the signal at its input changes from 0 to 1. Thus, any transition from 0 to 1 or 1 to 0 on either lead 110 or 114 results in a pulse from the output of gate 120.

Position counter 125 is a reversible four-stage binary counter, and the output of gate 120 is gated by AND-gates 121 and 122 into the COUNT DOWN and COUNT UP inputs thereof. The DIBIT signal is connected to an input of gate 122 and, via inverter 124, to an input of gate 121. When the output of inverter 124 is 1, pulses from gate 120 either decrement counter 125, if DIBIT is 1, or increment counter 125, if DIBIT is 0.

If counter 125 registers 0, 0-outputs from the four stages of counter 125 enable gate 132. If counter 125 is decremented from 0 to 15, a pulse on the BORROW output thereof sets flipflop 130. If counter 125 is incremented from 15 to 0, a pulse on the CARRY output thereof resets flipflop 130 through OR-gate 131. Thus, if counter 125 registers a negative value, the 1-output of flipflop 130 is 1; if counter 125 registers 0, the output of gate 132 is 1; but if counter 125 registers a positive value, both the 1-output of flipflop 130 and the output of gate 132 are 0.

Sample counter 133 comprises a three-stage binary counter that is incremented by 48-COUNT at the middle of each timing cycle. AND-gate 134 decodes one of the eight states of counter 133 to produce a SAMPLE signal, as shown at T in FIG. 12, which becomes 1 during every eighth timing cycle. SAMPLE is connected to AND-gates 140 and 141 and through inverter 142 to AND-gate 143. Outputs of gates 140, 141 and 143 are connected to inputs of OR-gate 144. If SAMPLE is 0, gates 143 and 144 become enabled when 95-COUNT becomes 1. If SAMPLE is 1, the state of counter 125 determines when gate 144 becomes enabled. If counter 125 is then negative, gates 140 and 144 become enabled when 94-COUNT becomes 1; if counter 125 then registers 0, gates 141 and 144 become enabled when 95-COUNT becomes 1; but if counter 125 is then positive, gate 144 becomes enabled directly when 96-COUNT becomes 1.

The output of gate 144 is connected to the D, (data) input of D-type flipflop 150, and $\phi B$ is connected to the CK (clock) input of flipflop 150. Thus, every $\phi B$ pulse will set or reset flipflop 150 according to whether the output of gate 144 is 1 or 0. The 1-output of flipflop 150 is the SYNCH signal, shown at X in FIG. 13. Counter 125 and flipflop 130 are reset by the output from gate 136 when END DIBIT and SAMPLE both become 1.

OR-gate 151 receives as inputs 94-COUNT, 95-COUNT and 96-COUNT. Thus, the output of gate 151 is 1 from the time when 94-COUNT changes from 0 to 1 to the time when 96-COUNT changes from 1 to 0. AND-gate 152 combines the output of gates 151 and 134, so that if SAMPLE is 1, and either 94-COUNT, 95-COUNT or 96-COUNT is 1, gate 152 and inverter 127 inhibit gates 121 and 122 to prevent pulses from gate 120 from incrementing or decrementing counter 125.

Figure 12:
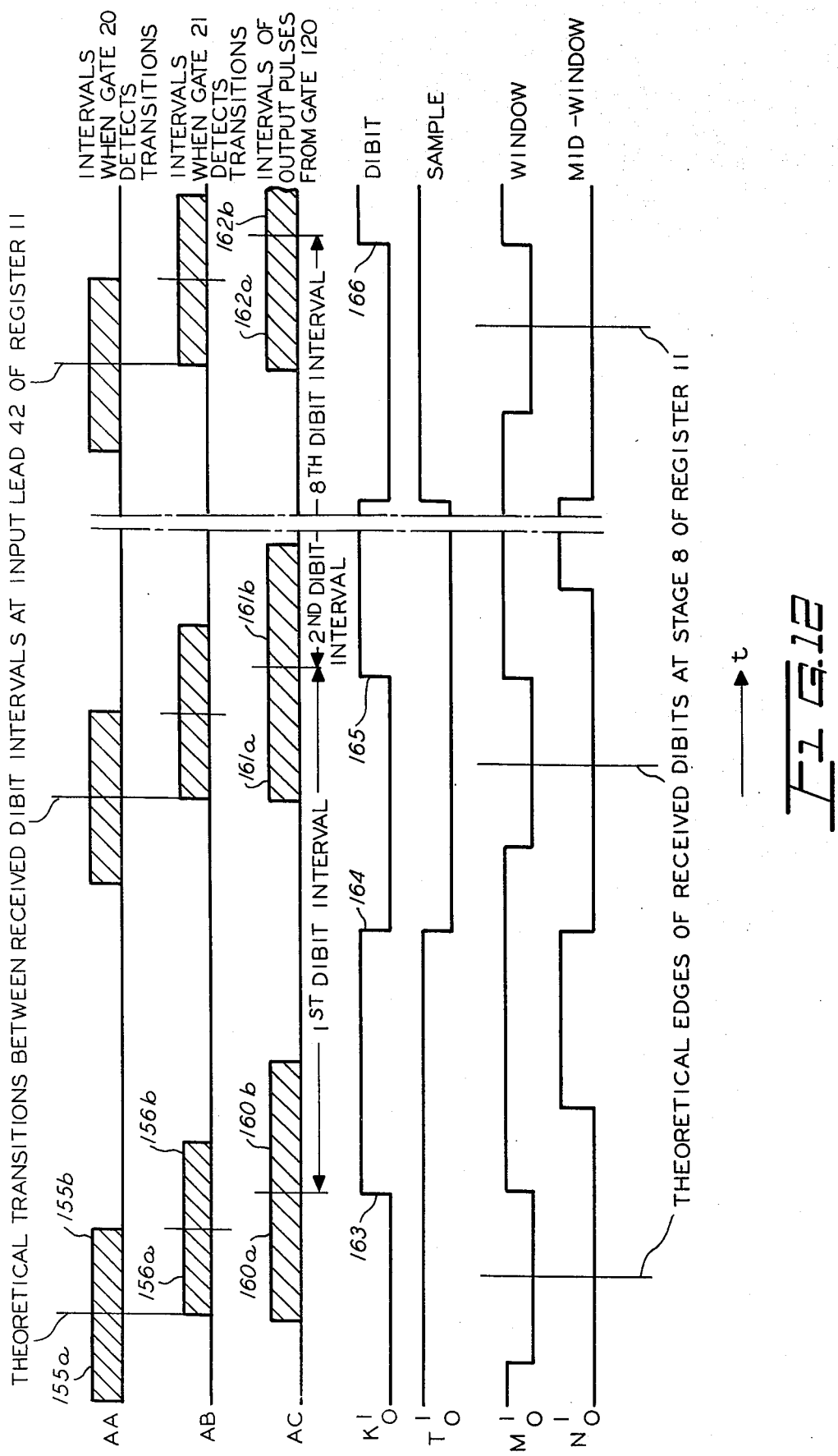
FIGS. 12 and 13 are graphical representations of digital signals useful in understanding the operation of the synchronizing circuit shown in FIG. 11.

The operation of synchronizing circuit 25 can be more readily understood by referring to FIG. 12, which graphically relates detected transitions between dibit intervals and the phase of the locally generated timing cycle as indicated by the DIBIT signal. In FIG. 12, line AA shows, with respect to theoretical transitons between received dibit intervals, intervals 155a and 155b where transitions detected by gate 20 (FIG. 1) can occur that result in transitions in the output of filter 22. Similarly, line AB shows intervals 156a and 156b where transitions detected by gate 21 can occur that result in transitions in the output of filter 23. For random data, the accumulated number of transitions occurring during a given number of intervals 155a will tend to equal the accumulated number of transitions occurring during corresponding intervals 155b. Similarly, for random data, the accumulated number of transitions in a given number of intervals 156a will tend to equal the accumulated number of transitions occurring during corresponding intervals 156b.

Because of the delays introduced by digital filters 22 and 23, the output pulses from gate 120 are delayed 15 counts of the $\phi B$ rate of 96 pulses/dibit from the transitions that caused the pulses. Intervals such as 160a and 160b, where output pulses from gate 120 occur, are shown in line AC in FIG. 12. These intervals can be thought of as combining the intervals shown in lines AA and AB and delaying these combined intervals by 15 counts. Again, for random data, the accumulated number of transitions in a given number of intervals 160a will tend to equal the accumulated number of transitions in corresponding intervals 160b. Note that the center lines between intervals such as 160a and 160b correspond to the 0 to 1 transitions such as 163 in the DIBIT signal. The SAMPLE, WINDOW and MID-WINDOW signals are shown in FIG. 12 for reference.

Returning now to FIG. 11, the count in position counter 125 indicates whether DIBIT signal is lagging, in phase with, or leading the received dibit intervals. Recall that this count is incremented or decremented by pulses from gate 120 that are routed to increment or decrement position counter 125 by means of gates 121 and 122, respectively, so that if DIBIT is 1, pulses from gate 120 increment counter 125 but if DIBIT is 0, pulses from gate 120 decrement counter 125.

Referring again to FIG. 12, assume that at transition 163 of DIBIT, the count in counter 125 is reset to 0. Because DIBIT is now 1, any pulses from gate 120 during the interval 160b in line AC will increment counter 125. However, after the 1 to 0 transition 164 in DIBIT, pulses from gate 120 during interval 161a in line AC will decrement counter 125. By the end of the eighth dibit interval, at transition 166, pulses from gate 120 will have incremented counter 125 during eight intervals such as 160b and decremented counter 125 during eight intervals such as 160a. If DIBIT is in phase with the received dibit intervals, counter 120 will then register 0 at transition 166. However, if DIBIT lags the received dibit intervals, the transitions therein will be shifted with respect to line AC, to the right as shown in FIG. 12, and more pulses will decrement rather than increment counter 125. At transition 166, counter 125 will thus register a negative count indicating that the eighth timing cycle should be shortened to correct the phase of the locally generated timing signals. Conversely, if DIBIT leads the received dibits, the transition therein will be shifted to the left with respect to line AC and more pulses will increment rather than decrement counter 125, so that at transition 165 counter 125 will register a positive count, indicating that the eighth timing cycle should be lengthened to correct the phase of locally generated timing signals.

If SAMPLE is 1, DIBIT is lagging, and counter 125 registers a negative count, gate 140 will be enabled when 94-COUNT is 1, so that flipflop 150 will be set by the $\phi$B pulse that occurs while 94-COUNT is 1. If DIBIT is in phase, and counter 125 registers 0, gate 141 will be enabled when 95-COUNT is 1, so that flipflop 150 will be set by the $\phi$B pulse that occurs while 95-COUNT is 1. Similarly, if DIBIT is leading, and counter 125 registers a positive count, flipflop 150 will be set by the $\phi$B pulse that occurs while 96-COUNT is 1. It is convenient here to recall that when SAMPLE is 0 at the end of a timing cycle, gate 144 will be enabled when 95-COUNT is 1, and flipflop 150 will be set by the $\phi$B pulse occurring while 95-COUNT is 1.

FIG. 13 illustrates the relationships among certain signals at the end of a timing cycle that is 97 counts long. Signals $\phi$A and $\phi$B are shown for reference. Signals 94-COUNT and 96-COUNT become 1, as shown. The $\phi$B pulse occurring when 96-COUNT is 1 sets flipflop 150, resulting in SYNCH becoming 1. Thus, gate 65 (FIG. 6) is disabled and gate 66 is enabled, so that the next $\phi$A pulse generates an END DIBIT pulse instead of incrementing timing counter 64. The END DIBIT pulse resets timing counter 64, sets flipflops 72, 75 and 77, resets flipflop 79, and, if SAMPLE is 1, resets position counter 125 (FIG. 11) and flipflop 130.

The combined operation of synchronizing circuit 25 and timing generator 26 can be thought of as a phase-locked loop, in which a signal whose frequency is a multiple of the frequency of a desired signal is generated by an oscillator and divided by a divisor that is usually constant, but that is increased or decreased as necessary to corret the phase of the desired signal. Counter 64 normally divides the frequency of timing signal $\phi$A by a divisor of 96 to determine the length of the timing cycle, but this divisor is changed to 95 or 97 if the timing cycle must be shortened or lengthened to maintain phase with the received dibits. The use of such a phase-locked loop is well known in the art, as exemplified by the article "Low-power digital phase locked loop utilizes CMOS logic" published in EDN-/EEE, Mar. 15, 1972.

Gates 151 and 152, and inverter 127 inhibit gates 121 and 122 during intervals when either SAMPLE is 1 or flipflop 155 is set, and when either 94-COUNT, 95-COUNT or 96-COUNT is 1. This feature "freezes" counter 125 during the interval when the state of counter 125 determines whether the current timing cycle is to be lengthened, shortened, or ended normally.

Turning now to FIG. 14, integrators 34, which is identical to integrators 35, 36 and 37, comprises integrator counter 170, AND-gates 171, 173 and 174, and OR-gate 172. Integrator counter 170 is a seven-stage binary up-counter. Gate 171 is enabled when both WINDOW is 1 and the input to the integrator are 1, thus enabling gate 173 to count pulses comprising a COUNT INTEGRATORS signal. Note from FIG. 12 that WINDOW is 1 during approximately the middle two-thirds of the received dibit intervals at stage 8 of register 11. Gate 174 provides an output when counter 170 registers 96. Gate 173 also gates pulses into counter 170 when COUNT REMAINDER is 1.

Integrator control 40, diagrammed more fully in FIG. 15, comprises OR-gates 180, 181 and 182, AND-gates 183 and 184, and inverter 185. The outputs of gates 182 and 184 are the COUNT INTEGRATORS and COUNT REMAINDER signals, respectively. The COUNT INTEGRATORS signal comprises $\phi$A pulses and, during intervals when either MID-WINDOW or ENABLE REMAINDER are 1, $\phi$B pulses in addition. Thus, the pulse rate of COUNT INTEGRATORS is either 96 pulses/dibit or 192 pulses/dibit. Note from FIG. 12 that MID-WINDOW is 1 during approximately the middle third of the received dibit intervals timed with respect to the output signal from stage 8 of register 11.

Referring again to FIG. 14, when the input to decoder 34 is 1 and WINDOW is 1, counter 170 is incremented at the pulse rate of COUNT INTEGRATORS. Because the rate of COUNT INTEGRATORS is 192 pulses/dibit when MID-WINDOW is 1, counter 170 is then incremented faster, thereby effectively weighting approximately the middle third of each dibit interval twice as much as the second sixth and the fifth sixth of the received dibit interval. Because counter 170 is not incremented when WINDOWW is 0, approximately the first and last sixths of each dibit interval are disregarded. Thus, the portions of each dibit interval least affected by noise or distortion are emphasized by integrator 34, and the portions most affected are deemphasized.

When WINDOW changes from 1 to 0, each integrator 34, 35, 36 and 37 contains a count in its counter 170 related to the time the input signal to the integrator was 1 during the previous dibit interval. The highest count indicates the received dibit. When ENABLE REMAINDER becomes 1, each counter 170 is incremented at 192 pulses/dibit until one of the counters registers a count of 96. The output of gate 174 associated with that counter then becomes 1, the output of gate 180 (FIG. 15) becomes 1, gate 184 is disabled, and COUNT REMAINDER signal becomes 0. The output of the gate 174 that has become 1 in one of the integrators 34, 35, 36 or 37 identifies the received dibit.

Referring now to FIG. 16, translator 41 comprises OR-gates 190 and 191 and two-stage shift register 192. Outputs from integrators 35, 36 and 37 are connected to inputs of gates 190 and 191. At the end of each dibit interval, END DIBIT loads shift register 192 according to the outputs of gates 190 and 191. Thus, the received dibit is loaded into shift register 192. The 1-output of stage 1 of shift register 192 becomes the DIGITAL DATA OUT signal. At the middle of each dibit, 48-

COUNT shifts the contents of stage 2 of register 192 into stage 1. Thus, a serial bit stream representing the received dibits is generated as DIGITAL DATA OUT.

FIG. 17 illustrates an alternate embodiment of the four-phase digital demodulator of the invention in which the received dibits are decoded from the outputs of the digital filters used primarily in timing section 17 of FIG. 1. Referring to FIG. 17, squaring circuit 15, shift register 16, exclusive-OR gates 20 and 21, digital filters 22 and 23, and synchronizing circuit 25 are identical to like-numbered elements in FIG. 1. Timing generator 26' in FIG. 17 generates timing signals similar to those generated by timing generator 26 in FIG. 1 but excluding those used solely by integrators 34, 35, 36 and 37 and integrator control 40 in FIG. 1.

Recall that the output of filter 22 represents the inverse of the second bit of the dibit combination represented by the phase shift between the previous and current dibit intervals, and the output of filter 23 represents the first bit of the same dibit combination. Thus, the outputs of filters 22 and 23 can be sampled at the middle of each dibit interval to determine the bits of the dibit combination currently represented. For this purpose, shift register 192 is connected to receive parallel signals from the outputs of filters 22 and 23, the output of filter 22 being connected through inverter 193 to compensate for the previously mentioned inverse relationship. Shift register 192' is identical to shift register 192 in FIG. 16. The LOAD and SHIFT inputs to shift register 192' can be 48-COUNT and END DIBIT from timing generator 26'.

In operation, shift register 192' is loaded with the two bits representing a received dibitr combination at count 48 in each timing cycle, and shifted at the end of each timing cycle. Thus, a serial bit stream comprising successively received dibits is generated as DIGITAL DATA OUT.

As indicated earlier, if the received wave is distorted or impressed with electrical noise by the communications channel, the accuracy of the preferred digital demodulator of FIG. 1 will be superior to that of the demodulator of FIG. 17. However, the latter demodulator comprises fewer elements, and could, therefore, be desirable for less critical applications.

FIG. 18 shows an alternate and more general embodiment of the digital demodulator of FIG. 1 that is useful in demostrating how the principles of the invention can be extended to digital demodulators for other, similar phase modulating schemes. Referring to FIG. 18, squaring circuit 15 and the elements of timing section 17 are identical to like elements in the digital demodulator shown in FIG. 1, as are most of the elements in decoding section 18'. However, shift register 16' comprises 128 stages numbered 1–128, instead of the 113 stages of shift register 15, and the contents of pairs of stages of shift register 15' are compared by exclusive-OR gates 200, 201, 202 and 203, which are connected through inverters 204, 205, 206 and 207 to integrators 34, 35, 36 and 37.

The digital demodulator shown in FIG. 18 is designed to receive and decode the same phase-modulated wave as the demodulator of FIG. 1, that is, a wave whose phase shift between dibit intervals of +45°, +135°, +225° and +315° encode 11, 10, 00 and 01 dibit combinations. Each exclusive-OR gate 200, 201, 202 and 203 is associated with a given dibit combination, and is connected to two stages of shift register 16' that contain in-phase samples of the waves received during the previous and current dibit intervals when the given dibit combination is encoded thereby. For example, inputs of gate 200 are connected to stages 8 and 128. Thus, 120 stages separate the samples compared by gate 200. Since 96 stages encompass the samples of one dibit interval, the sample in stage 128 is delayed in phase by an amount corresponding to 120 − 96 = 24 samples with respect to the sample in stage 8. Since a cycle of the carrier wave is encompassed by 64 samples in 64 stages of shift register 16', a span of 24 samples represents a phase delay of 24/64 × 360° = 135°, or a corresponding phase advance of 360° − 135° = 225°. If the carrier wave received during the current dibit interval is advanced in phase 225 with respect to the wave received during the previous dibit interval, the inputs to gate 200 will be substantially identical, the output of gate 200 will be substantially 0, and the output of inverter 204 will be substantially 1. Thus, integrator 34 will register the highest count to indicate receipt of the 00 dibit combination encoded by the +225° phase shift.

Gates 201, 202 and 203, inverters 205, 206 and 207, and integrators 35, 36 and 37 respond to the phase relationships encoding their respective dibits in a similar manner to gate 200, inverter 204 and integrator 34.

If a digital demodulator according to the invention is required for phase-modulated waves encoded by other schemes, exclusive-OR gates can be connected to appropriate stages of a shift register, such as 15', to decode the phase shifts in the wave. For example, a commonly used eight-phase encoding scheme results in a wave comprising phase shifts between signalling intervals that are odd multiples of 22.5°. A phase shift of 22.5° between successive signalling intervals can be sensed by an exclusive-OR gate having inputs connected to stages 8 and 100 of shift register 15'. Clearly, other phase shifts can be sensed by exclusive-OR gates connected to appropriately selected stages of shift register 15', and shift register 15' can be extended if necessary to provide appropriately delayed waves.

The digital demodulator diagrammed in FIG. 1 is a simplification of the digital demodulator of FIG. 18 in that exclusive-OR gates 30 and 31 in FIG. 1 each decode pairs of dibits encoded by pairs of phase shifts that differ by 180°. Referring again to FIG. 18, gate 20 compares the contents of stages 8 and 128 to decode the 00 dibit combination, whereas gate 21 compares the contents of stages 8 and 96 to decode the 11 dibit combination. The phase shifts encoding these dibits, +45° and +225°, differ by 180°, so that a sample in stage 96 is 180° out of phase with a sample in stage 128. Therefore, the sample in stage 128 could be represented by inverting the sample from stage 96, for example, by replacing the connection from stage 128 with a connection from stage 96 via inverter 210. Similarly, the sample in stage 80 could be represented by inverting the sample from stage 112, by means of inverter 211. Thus, in the demodulator shown in FIG. 1, samples from stages 96 and 112 can be used in conjunction with the samples from stage 8 to decode the four dibits.

It can be shown by well-known logic circuit analysis methods that the network comprising gates 30 and 31 and inverters 32 and 33 in FIG. 1 is the equivalent of the network comprising gates 200, 201, 202 and 203, and inverters 204, 205, 206, 207, 210 and 211 in FIG. 7. Obviously, the former network is preferred for its fewer components and shorter shift register. Clearly, similar simplifications can be made in digital demodulators for other phase-shift encoding schemes wherein pairs of phase shifts differ by 180°.

The preferred embodiment of the invention described above is satisfactory for demodulatiing four-phase analog data signals wherein the dibit rate is 1200 dibits/second and the carrier frequency is 1800 Hz. Clearly, other configurations of the invention can be contemplated for this bit rate and carrier frequency, and for applications using other bit rates and carrier frequencies, without departing from the spirit and scope of the invention. For example, if it were considered necessary to sample the received analog wave more frequently, shift register 11 in FIG. 1 could comprise more stages, fixed oscillator 60 in FIG. 6 could operate at a higher frequency, and timing counter 64 could comprise more stages. Similarly, if it were considered desirable to accumulate more samples of phase transitions between phase corrections of the timing cycles, sample counter 133 is FIG. 11 could be enlarged. Other such changes that do not result in a departure from the invention will readily occur to one skilled in the art.

What is claimed is:

1. A demodulator for a received wave having phase shifts between successive signalling intervals the phase shifts encoding data elements, which includes: a timing generator, means for synchronizing the timing generator with the received wave, means for generating a squared version of the received wave, a shift register for storing periodic samples of the squared wave for a period encompassing a current signalling interval and at least a portion of a previous signalling interval, a plurality of exclusive-OR gates connected to stages of the shift register for comparing selected pairs of samples from the shift register; and means controlled by the exclusive-OR gates and the timing generator for identifying which data element is received during each signalling interval, wherein the identifying means comprises:

a. for each data element:
  i. a counter,
  ii. an output gate connected to the counter for sensing when the counter reaches a particular count,
  iii. means controlled by the timing generator and the exclusive-OR gate whose selected output state is associated with the data element for incrementing the counter at a first periodic rate during a mid-portion of each signalling interval when the output signal of the exclusive-OR gate is in the selected state;

b. means controlled by the timing generator and the output gates for simultaneously incrementing all of the counters at a second periodic rate higher than the first periodic rate during a portion of each signalling interval subsequent to the mid-portion until one of the output gates becomes enabled, thus identifying the data element associated with the enabled output gate as received during the signalling interval; and c. means controlled by the timing generator for resetting the counters subsequent to one of the output gates becoming enabled and before the mid-portion of the next signalling interval.

2. Apparatus of claim 1 wherein the incrementing means for each data element further comprises:
means controlled by the timing generator for incrementing the counter at different periodic rates during different periods of the mid-portion of each signalling interval to thereby give different emphasis to the received wave during the different periods of the mid-portion.

3. Apparatus for demodulating a received wave having phase-shifts of +45°, +1350°, +,,° and +315° between successive signalling intervals, the phase shifts encoding four dibit combinations, which comprises:

a timing generator;

means for synchronizing the timing generator with the received wave;

means for generating a squared version of the received wave;

a shift register having a plurality of stages for serially storing samples at a first periodic rate of the squared wave encompassing a current signalling interval and at least a portion of a previous signalling interval;

a first exclusive-OR gate associated with the first and the second of the dibit combinations for comparing samples stored in two stages selected to encompass the span between like-phased samples of the waves from the previous and current signalling intervals;

a first counter associated with the first dibit combination;

a second counter associated with the second dibit combination;

means controlled by the timing generator and the first exclusive-OR gate for incrementing at the first periodic rate during a mid-portion of each signalling interval, the first counter when the output of the first exclusive-OR gate indicates that the samples compared thereby agree, and the second counter when the output of the first exclusive-OR gate indicates that the samples compared thereby differ;

a second exclusive-OR gate associated with the third and the fourth of the dibit combinations for comparing samples stored in two stages selected to encompass the span between like-phased samples of the waves from the previous and current signalling intervals;

a third counter associated with the third dibit combination;

a fourth counter associated with the fourth dibit combination;

means controlled by the timing generator and the second exclusive-OR gate for periodically incrementing at the first periodic rate, during a mid-portion of each signalling interval, the third counter when the output of the second exclusive-OR gate indicates that the samples compared thereby agree, and the fourth counter when the output of the second exclusive-OR gate indicates that the samples compared thereby differ;

four output gates, one of the output gates being connected to each counter for sensing when that counter reaches a particular count;

means controlled by the timing generator and the output gates for simultaneously incrementing the counters at a second periodic rate higher than the first periodic rate during a portion of each signalling interval subsequent to the mid-portion until one of the output gates becomes enabled, thus identifying the data element associated with the enabled output gate as received during the signalling interval; and means controlled by the timing generator for resetting the counters subsequent to one of the output gates becoming enabled and before the mid-portion of the next signalling interval.

4. Apparatus of claim 3 wherein the received wave comprises an 1800 Hz carrier wave, the signalling intervals are repeated at a rate of 1200 per second, the first periodic rate is substantially 96 operations per signalling interval, the shift register comprises 112 stages numbered 1 to 112, samples being shifted in the direction from stage 1 to stage 112, the first exclusive-OR gate compares samples from stages 8 and 96, and the second exclusive-OR gate compares samples from stages 8 and 112.

5. Apparatus of claim 4 wherein the means for incrementing the first and second counters further comprises:

means controlled by the timing generator for incrementing the first and second counters, according to the output of the first exclusive-OR gate, at a periodic rate of 192 counts per signalling interval during substantially the middle third of each signalling interval, and at the first periodic rate during substantially the second sixth and the fifth sixth of each signalling interval, and wherein the means for incrementing the third and fourth counters further comprises:

means controlled by the timing generator for incrementing the third and fourth counters, according to the output of the second exclusive-OR gate, at the periodic rate of 192 counts per signalling interval during substantially the middle third of each signalling interval, and at the first periodic rate during substantially the second sixth and the fifth sixth of each signalling interval.

6. A demodulator for a received wave having phase shifts of +45°, +135°, +225° and +315° between successive signalling intervals that encode a respective plurality of dibit combinations of the type having: a timing generator, means for synchronizing the timing generator with the received wave, means for generating a squared version of the received wave, a shift register for storing periodic samples of the squared wave for a period encompassing a current signalling interval and at least a portion of a previous signalling interval, means responsive to selected samples from the shift register and controlled by the timing generator for decoding data elements received during each signalling interval and for loading the received data elements into an output register, characterized in that:

the means for decoding data elements comprises a pair of exclusive-OR gates connected to selected stages of the shift register for comparing pairs of samples from the shift register;

a first filter connected to the output of the first one of the exclusive-OR gates to eliminate shortterm transitions in the output signal thereof, the first exclusive-OR gate being connected to compare the first sample with the second sample delayed by one signalling interval with respect to the first sample;

a second filter connected to the output of the second one of the exclusive-OR gates to eliminate short-term transitions in the output signal thereof, the second exclusive-OR gate being connected to compare the first sample with the third sample removed drom the second sample by an interval occupied by a 90° segment of the received wave, the short-term transitions eliminated by the first and second filters having a duration shorter than the interval occupied by a 90° segment of the received wave; and means controlled by the timing generator for loading the output of the first filter directly into one stage of the output register to represent one bit of the received dibit combination and for loading the output of the second filter directly into another stage of the output register to represent the other bit of the received dibit combination.

7. A demodulator of claim 6 wherein the means for synchronizing the timing generator with the received wave is directly connected to and responsive to the outputs of the first and second filters.

* * * * *

UNITED STATES PATENT OFFICE
CERTIFICATE OF CORRECTION

PATENT NO. : 3,938,052
DATED : February 10, 1976
INVENTOR(S) : Jerry M. Glasson et al.

It is certified that error appears in the above-identified patent and that said Letters Patent are hereby corrected as shown below:

Column 16, line 5, "+1350°" should read -- +135° --;

line 5, "+,,o" should read -- +225° --.

Column 18, line 24, "drom" should read -- from --.

Signed and Sealed this

First Day of February 1977

[SEAL]

Attest:

RUTH C. MASON
*Attesting Officer*

C. MARSHALL DANN
*Commissioner of Patents and Trademarks*